United States Patent
Morisaka et al.

(10) Patent No.: US 7,910,514 B2
(45) Date of Patent: Mar. 22, 2011

(54) INORGANIC FIBER CATALYST, PRODUCTION METHOD THEREOF AND CATALYST STRUCTURE

(75) Inventors: Hideaki Morisaka, Yokohama (JP); Masahiro Takaya, Yokosuka (JP); Yasunari Hanaki, Yokohama (JP); Kouji Masuda, Tokyo (JP); Michiaki Sagesaka, Fujieda (JP); Naoki Harakawa, Fujieda (JP)

(73) Assignees: Nissan Motor Co., Ltd., Tokyo (JP); Nitivy Co., Ltd., Tokyo (JP)

( * ) Notice: Subject to any disclaimer, the term of this patent is extended or adjusted under 35 U.S.C. 154(b) by 136 days.

(21) Appl. No.: 12/170,734

(22) Filed: Jul. 10, 2008

(65) Prior Publication Data

US 2009/0042721 A1 Feb. 12, 2009

(30) Foreign Application Priority Data

Aug. 9, 2007 (JP) .................. 2007-207363

(51) Int. Cl.
- *B01J 23/00* (2006.01)
- *B01J 21/00* (2006.01)
- *B01J 20/00* (2006.01)
- *B01J 29/00* (2006.01)
- *B01J 37/00* (2006.01)

(52) U.S. Cl. ........ 502/241; 502/240; 502/242; 502/263; 502/302; 502/303; 502/304; 502/324; 502/349; 502/355; 502/407; 502/439; 502/527.14

(58) Field of Classification Search ................. 502/240, 502/241, 242, 263, 302, 303, 304, 324, 349, 502/355, 407, 439, 527.14

See application file for complete search history.

(56) References Cited

U.S. PATENT DOCUMENTS

| | | | | |
|---|---|---|---|---|
| 3,260,681 A | * | 7/1966 | Sanford et al. | 502/263 |
| 3,554,929 A | * | 1/1971 | Aarons | 502/178 |
| 4,224,190 A | * | 9/1980 | Villadsen et al. | 502/253 |
| 4,657,880 A | * | 4/1987 | Lachman et al. | 502/64 |
| 4,749,671 A | * | 6/1988 | Saito et al. | 502/64 |
| 4,797,378 A | | 1/1989 | Sowman | |
| 4,940,682 A | * | 7/1990 | Sasaki et al. | 502/113 |
| 5,094,993 A | * | 3/1992 | Miura et al. | 502/255 |
| 5,155,083 A | * | 10/1992 | Yoshida et al. | 502/242 |
| 5,217,933 A | | 6/1993 | Budd et al. | |

(Continued)

FOREIGN PATENT DOCUMENTS

EP 0 639 542 A1 2/1995

(Continued)

OTHER PUBLICATIONS

K. Harada et al., "Lowering Combustion Temperature of Carbon Particles on Pt-supported Ceria Series Oxides", Journal of the Japan Petroleum Institute, vol. 48, pp. 216-222, (2005).

*Primary Examiner* — Cam N Nguyen
(74) *Attorney, Agent, or Firm* — Foley & Lardner LLP

(57) ABSTRACT

An inorganic fiber catalyst includes an alumina-silica fiber base material, and a plurality of catalyst component particles contained in the alumina-silica fiber base material. A mean particle diameter of the catalyst component particles contained in at least a surface portion of the alumina-silica fiber base material is 50 nm or less, and a standard deviation of particle diameters of the catalyst component particles is 30 or less.

6 Claims, 5 Drawing Sheets

U.S. PATENT DOCUMENTS

| | | | |
|---|---|---|---|
| 5,316,714 A * | 5/1994 | Yoneda et al. | 264/210.6 |
| 5,316,996 A * | 5/1994 | Itoh | 502/238 |
| RE34,804 E * | 12/1994 | Lachman et al. | 502/64 |
| 5,504,051 A * | 4/1996 | Nakamura et al. | 502/261 |
| 5,863,516 A * | 1/1999 | Otterstedt et al. | 423/700 |
| 5,863,647 A * | 1/1999 | Yoneda et al. | 428/331 |
| 6,040,265 A * | 3/2000 | Nunan | 502/242 |
| 6,326,329 B1 * | 12/2001 | Nunan | 502/242 |
| 6,787,230 B2 * | 9/2004 | Kim | 428/401 |
| 7,211,536 B2 * | 5/2007 | Lopez et al. | 502/120 |
| 7,235,507 B2 * | 6/2007 | Xu et al. | 502/63 |
| 7,244,689 B2 * | 7/2007 | Addiego et al. | 502/439 |
| 7,381,682 B1 * | 6/2008 | Jia et al. | 502/327 |
| 7,528,092 B2 * | 5/2009 | Berben et al. | 502/251 |
| 7,541,310 B2 * | 6/2009 | Espinoza et al. | 502/326 |
| 7,553,531 B2 * | 6/2009 | Ohno et al. | 428/116 |
| 7,611,815 B2 * | 11/2009 | Sugiura et al. | 430/108.7 |
| 7,625,529 B2 * | 12/2009 | Ohno et al. | 422/180 |
| 7,794,815 B2 * | 9/2010 | Ohno et al. | 428/116 |
| 2002/0023419 A1 | 2/2002 | Penth et al. | |
| 2002/0039964 A1 | 4/2002 | Tanaka et al. | |
| 2004/0250826 A1 | 12/2004 | Li et al. | |
| 2006/0205978 A1 * | 9/2006 | Yunoki et al. | 562/534 |
| 2009/0257933 A1 * | 10/2009 | Chen et al. | 423/213.2 |

FOREIGN PATENT DOCUMENTS

| | | |
|---|---|---|
| EP | 1 418 317 A1 | 5/2004 |
| EP | 1 927 400 A1 | 6/2008 |
| JP | 60-224814 A | 11/1985 |
| JP | 2002-326036 A | 12/2002 |

* cited by examiner

FIG. 8

| | Mean particle diameter (nm) | Standard deviation | $d_a/d_b$ | Fiber diameter ($\mu m$) | Type of catalyst component particles | Type of raw material of catalyst component particles | Amount of generated CO and $CO_2$ (mmol) |
|---|---|---|---|---|---|---|---|
| Ex. 1 | 28.66 | 24.38 | 1.2 | 30 | $CeO_2$ | Nano-order sol dispersion of oxide | 0.158 |
| Ex. 2 | 28.41 | 28.12 | 1.2 | 15 | $CeO_2$ | Nano-order sol dispersion of oxide | 0.166 |
| Ex. 3 | 30.15 | 25.94 | 1.2 | 7 | $CeO_2$ | Nano-order sol dispersion of oxide | 0.178 |
| Ex. 4 | 29.61 | 24.85 | 1.3 | 5 | $CeO_2$ | Nano-order sol dispersion of oxide | 0.164 |
| Ex. 5 | 33.32 | 19.85 | 1.3 | 30 | $CeO_2$-$Pr_6O_{11}$ | Nano-order sol dispersion of oxide | 0.199 |
| Ex. 6 | 37.17 | 24.68 | 1.3 | 15 | $CeO_2$-$Pr_6O_{11}$ | Nano-order sol dispersion of oxide | 0.215 |
| Ex. 7 | 31.08 | 22.68 | 1.3 | 7 | $CeO_2$-$Pr_6O_{11}$ | Nano-order sol dispersion of oxide | 0.208 |
| Ex. 8 | 33.97 | 22.19 | 1.3 | 5 | $CeO_2$-$Pr_6O_{11}$ | Nano-order sol dispersion of oxide | 0.211 |
| Ex. 9 | 45.68 | 25.81 | 1.5 | 30 | $CeO_2$-$Pr_6O_{11}$-$MnO_2$ | Nano-order sol powder of oxide | 0.222 |
| Ex. 10 | 43.81 | 28.66 | 1.5 | 15 | $CeO_2$-$Pr_6O_{11}$-$MnO_2$ | Nano-order sol powder of oxide | 0.231 |
| Ex. 11 | 46.55 | 28.1 | 1.5 | 7 | $CeO_2$-$Pr_6O_{11}$-$MnO_2$ | Nano-order sol powder of oxide | 0.228 |
| Ex. 12 | 48.18 | 28.99 | 1.5 | 5 | $CeO_2$-$Pr_6O_{11}$-$MnO_2$ | Nano-order sol powder of oxide | 0.227 |
| Ex. 13 | 31.06 | 20.54 | 1.3 | 30 | $CeO_2$-$Y_2O_3$ | Nano-order sol powder of oxide | 0.21 |
| Ex. 14 | 29.51 | 19.28 | 1.3 | 15 | $CeO_2$-$Y_2O_3$ | Nano-order sol powder of oxide | 0.223 |
| Ex. 15 | 33.02 | 19.72 | 1.3 | 7 | $CeO_2$-$Y_2O_3$ | Nano-order sol powder of oxide | 0.214 |
| Ex. 16 | 33.72 | 20.31 | 1.3 | 5 | $CeO_2$-$Y_2O_3$ | Nano-order sol powder of oxide | 0.211 |
| Ex. 17 | 45.52 | 26.41 | 1.5 | 30 | $CeO_2$-$Y_2O_3$-$MnO_2$ | Nano-order sol powder of oxide | 0.241 |
| Ex. 18 | 44.83 | 25.89 | 1.5 | 15 | $CeO_2$-$Y_2O_3$-$MnO_2$ | Nano-order sol powder of oxide | 0.253 |
| Ex. 19 | 44.36 | 28.2 | 1.5 | 7 | $CeO_2$-$Y_2O_3$-$MnO_2$ | Nano-order sol powder of oxide | 0.234 |
| Ex. 20 | 42.11 | 27.48 | 1.5 | 5 | $CeO_2$-$Y_2O_3$-$MnO_2$ | Nano-order sol powder of oxide | 0.248 |
| Com. Ex. 1 | 80.32 | 51.46 | 11 | 30 | $CeO_2$ | Cerium nitrate | 0.102 |
| Com. Ex. 2 | 78.49 | 48.99 | 11 | 15 | $CeO_2$ | Cerium nitrate | 0.103 |
| Com. Ex. 3 | 83.22 | 48.51 | 11 | 7 | $CeO_2$ | Cerium nitrate | 0.099 |
| Com. Ex. 4 | 82.17 | 50.17 | 13 | 5 | $CeO_2$ | Cerium nitrate | 0.112 |
| Com. Ex. 5 | 67.87 | 42.15 | 11 | 30 | $CeO_2$-$Pr_6O_{11}$ | Cerium nitrate and Praseodymium nitrate | 0.138 |
| Com. Ex. 6 | 64.96 | 51.7 | 11 | 15 | $CeO_2$-$Pr_6O_{11}$ | Cerium nitrate and Praseodymium nitrate | 0.124 |
| Com. Ex. 7 | 65.95 | 48.48 | 11 | 7 | $CeO_2$-$Pr_6O_{11}$ | Cerium nitrate and Praseodymium nitrate | 0.118 |
| Com. Ex. 8 | 60.55 | 49.33 | 13 | 5 | $CeO_2$-$Pr_6O_{11}$ | Cerium nitrate and Praseodymium nitrate | 0.122 |

INORGANIC FIBER CATALYST, PRODUCTION METHOD THEREOF AND CATALYST STRUCTURE

BACKGROUND OF THE INVENTION

1. Field of the Invention

The present invention relates to an inorganic fiber catalyst, a production method thereof and a catalyst structure. More specifically, the present invention relates to an inorganic fiber catalyst that contains catalyst component particles which are microfabricated and highly dispersed, and is capable of suppressing exfoliation of the catalyst component particles, and relates to a production method of the inorganic fiber catalyst, and a catalyst structure using the inorganic fiber catalyst.

2. Description of the Related Art

In recent years, a diesel engine has attracted attention since the diesel engine has better fuel efficiency than a gasoline engine and is capable of reducing an emission amount of carbon dioxide ($CO_2$). In such a diesel engine, reduction of particulate matter (PM) contained in exhaust gas has become a technical subject. For this technical subject, there has been employed a method of collecting and purifying the PM by using a diesel particulate filter composed of an inorganic fiber on which a catalyst is supported.

Moreover, in some case, the PM cannot be oxidized sufficiently at a temperature of the exhaust gas discharged by the diesel engine, and accordingly, it has been examined to also use a promoter. For example, it has been reported that a rare earth element oxide such as cerium-praseodymium oxide and cerium-zirconium oxide is effective in oxidizing the PM (refer to Koichiro HARADA, Yoshinori TSUSHIO, and Akihide TAKAMI, *Journal of the Japan Petroleum Institute*, Vol. 48, No. 4, p. 216 (2005).

Meanwhile, as a method of supporting the catalyst component and the promoter component on such the inorganic fiber, there has been known a method of dipping the inorganic fiber into an aqueous solution containing a surfactant and organic acid salts of these components, followed by drying/baking (refer to Japanese Patent Unexamined Publication No. 2002-326036).

BRIEF SUMMARY OF THE INVENTION

However, the conventional particulate filter, in which the catalyst component and promoter component are supported on the inorganic fiber, has not been able to uniformly support these components on a surface of the inorganic fiber. Moreover, the particulate filter has had a problem that the catalyst component and the like are prone to be exfoliated from the surface of the inorganic fiber.

The present invention has been made in consideration for the problems inherent in the related art. It is an object of the present invention to provide an inorganic fiber catalyst that contains catalyst component particles which are microfabricated and highly dispersed, and is capable of suppressing the exfoliation of the catalyst component particles, to provide a production method of the inorganic fiber catalyst, and to provide a catalyst structure using the inorganic fiber catalyst.

The first aspect of the present invention provides an inorganic fiber catalyst comprising: an alumina-silica fiber base material; and a plurality of catalyst component particles contained in the alumina-silica fiber base material, wherein a mean particle diameter of the catalyst component particles contained in at least a surface portion of the alumina-silica fiber base material is 50 nm or less, and a standard deviation of particle diameters of the catalyst component particles is 30 or less.

The second aspect of the present invention provides a method of producing an inorganic fiber catalyst, comprising: preparing a raw material of an alumina-silica fiber base material and an oxide sol as a raw material of catalyst component particles; blending the raw material of the alumina-silica fiber base material and the oxide sol with each other, thereby preparing a sol dispersion; spinning the sol dispersion, thereby obtaining a precursor of the inorganic fiber catalyst; and baking the precursor of the inorganic fiber catalyst.

BRIEF DESCRIPTION OF THE SEVERAL VIEWS OF THE DRAWING

FIG. 8 is a table showing configurations and evaluation results of inorganic fiber catalysts of examples and comparative examples.

DETAILED DESCRIPTION OF THE INVENTION

Figure 1:
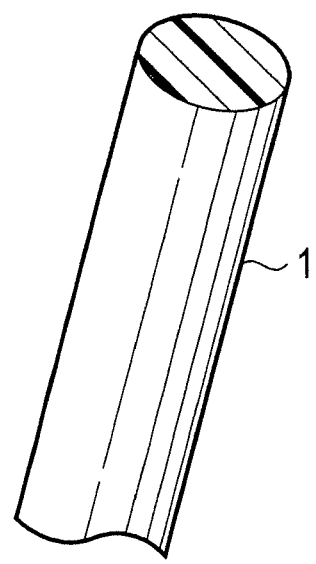
FIG. 1 is a perspective view showing an example of an inorganic fiber catalyst according to an embodiment of the present invention.

A description will be made below of an inorganic fiber catalyst of the present invention. Note that, in this specification and claims, "%" added to values of concentrations, contents and the like represents a mass percentage unless otherwise specified.

(Inorganic Fiber Catalyst)

An inorganic fiber catalyst of the present invention includes: an alumina-silica fiber base material; and catalyst component particles contained in the alumina-silica fiber base material. In the inorganic fiber catalyst, a mean particle diameter thereof, which serves as a center value of dispersed distribution of the catalyst component particles, is 50 nm or less, and a standard deviation of diameters of such particles is 30 or less. With such a configuration, the catalyst component particles can be suppressed from dropping and exfoliating from the alumina-silica fiber base material owing to thermal deterioration thereof, thermal shrinkage thereof, an impact applied thereto, and the like. Moreover, the catalyst component particles are contained in the base material in a state of being microfabricated and highly dispersed. Accordingly, also on a surface of the fiber, the catalyst component particles are in a state of being microfabricated and highly dispersed, whereby a surface area of the catalyst component particles is large, and the catalyst component particles can exert excellent catalytic activity.

Here, the "mean particle diameter" serves as the center value of the dispersed distribution of the catalyst component particles in the inorganic fiber catalyst, and is measured and calculated by the following method. First, an extremely thin slice is cut out from the inorganic fiber catalyst by a focused ion beam (FIB) process and the like, and a cross section of the fiber is observed by a transmission electron microscope (TEM). Subsequently, by commercially available software (A-zo kun (trade name), made by Asahi Kasei Engineering Corporation), the catalyst component particles are subjected to image analysis processing from a field of view with a square of 1.5 μm by 1.5 μm in an observed image, whereby a projected area of 30 or more of the catalyst component particles is measured. Moreover, projected area equivalent diameters (Heywood diameters) of the respective catalyst component particles are calculated, and an arithmetic mean of the projected area equivalent diameters thus calculated is calculated, whereby the mean particle diameter is obtained. Specifically, when the projected area equivalent diameters of the respective catalyst component particles are $x_1, x_2 \ldots, x_n$, the arithmetic mean thereof as the mean particle diameter is obtained by the following Expression 1. Then, a sample variance shown in Expression 2 is obtained from this arithmetic mean, and a positive square root σ of this sample variance becomes the standard deviation. Note that this standard deviation becomes a center value of variations of the particle diameter of the catalyst component particles.

$$\bar{x} = \frac{1}{n}\sum_{i=1}^{n} x_i \quad \text{(Expression 1)}$$

$$\sigma^2 = \frac{1}{n}\sum_{i=1}^{n} (x_i - \bar{x})^2 \quad \text{(Expression 2)}$$

Moreover, in the inorganic fiber catalyst of the present invention, the mean particle diameter is not particularly limited as long as it is 50 nm or less as described above; however, is preferably 10 nm to 50 nm, more preferably 10 nm to 35 nm. It is difficult to produce an inorganic fiber catalyst with a mean particle diameter of less than 10 nm as of now, and productivity of the inorganic fiber catalyst is not sometimes enhanced in such a case of attempting to reduce the mean particle diameter to 10 nm or less.

Meanwhile, the standard deviation is not particularly limited as long as it is 30 or less as described above; however, is preferably 10 to 30. Here, that the standard deviation is 30 stands for that, in the case where the mean particle diameter is 50 nm, 68.27% of the catalyst component particles are distributed within a particle diameter of 50 nm±30 nm. The standard deviation is 30 or less as described above, whereby the variations of the particle diameters of the catalyst component particles contained in the inorganic fiber catalyst are reduced, thus making it possible to prevent the catalyst component particles from dropping owing to the thermal shrinkage and the impact in the fiber base material. Note that it is difficult to produce an inorganic fiber catalyst with a standard deviation of less than 10 as of now, and the productivity of the inorganic fiber catalyst is not sometimes enhanced in such a case of attempting to reduce the standard deviation to less than 10.

Moreover, in the inorganic fiber catalyst of the present invention, a fiber diameter is not particularly limited; however, is preferably 3 μm to 30 μm, more preferably 5 μm to 15 μm. In the case where the fiber diameter is less than 3 μm, fiber strength of the inorganic fiber catalyst is sometimes decreased. Note that the fiber diameter here can be obtained by observing the cross section of the fiber by a scanning electron microscope (SEM).

Meanwhile, the particle diameters of the catalyst component particles are not particularly limited; however, are preferably 1 nm to 200 nm, more preferably 1 nm to 100 nm, still more preferably 5 nm to 50 nm. In the case where the particle diameters of the respective catalyst component particles exceed 200 nm, it sometimes becomes difficult to give an increase of the surface area of the catalyst component particles, which is important for enhancing the catalytic activity. Moreover, in such a case of attempting to reduce the particle diameters of the respective catalyst component particles to less than 1 nm, it is difficult to suppress particle growth and segregation as of now, and the productivity of the inorganic fiber catalyst is not sometimes enhanced. Furthermore, in the case where the particle diameters are less than 1 nm, the particles are sometimes less likely to become active sites in the catalytic activity. Note that the particle diameters of the catalyst component particles here refer to the above-described projected area equivalent diameters.

Moreover, the content of the above-described catalyst component particles in the inorganic fiber catalyst is not particularly limited; however, in oxide conversion, is preferably 5 to 50%, more preferably 8 to 30%. In the case where the content of the catalyst component particles in the inorganic fiber catalyst is less than 5% in oxide conversion, a sufficient catalytic function is not sometimes obtained. Meanwhile, in the case where the above-described content exceeds 50%, the content of the alumina-silica fiber base material composing the inorganic fiber catalyst is relatively decreased, whereby a probability that the fiber strength may be decreased is increased.

Furthermore, the above-described catalyst component particles are not particularly limited; however, are preferably those in which a ratio $(d_a/d_b)$ of a first crystallite diameter $d_a$ to a second crystallite diameter $d_b$ is 1.0 to 1.5. Here, the second crystallite diameter $d_b$ is a diameter at an initial period (that is, before the catalyst component particles are subjected to heat treatment) of the catalyst component particles, which is measured by X-ray diffraction, and the first crystallite diameter $d_a$ is a diameter after the catalyst component particles are subjected to the heat treatment at 1100° C. for 3 hours, which is measured by the X-ray diffraction. Under fabrication conditions to be described later, it is impossible that the ratio $d_a/d_b$ may become less than 1.0. Meanwhile, in the case where the ratio $d_a/d_b$ exceeds 1.5, the surface area of the catalyst component particles is sometimes decreased by the heat treatment, leading to the decrease of the catalytic activity. Note that the above-described heat treatment refers to treatment of heating the inorganic fiber catalyst for 3 hours in the air. Moreover, the crystallite diameter can be obtained by calculation in the Scherrer's equation by using an X-ray diffraction apparatus.

The component of the above-described catalyst component particles is not particularly limited; however, for example, there can be mentioned oxides containing, as constituent elements, cerium (Ce), praseodymium (Pr), yttrium (Y), lanthanum (La), zirconium (Zr), gallium (Ga), manganese (Mn), and arbitrary combinations of these elements. Moreover, such oxides containing two or more constituent elements may be mixed oxides or composite oxides. In particular, it is desirable that the cerium and the praseodymium be contained as the constituent elements.

Meanwhile, the above-described alumina-silica fiber base material is not particularly limited; however, should be a material containing an oxide that contains aluminum (Al) and silicon (Si) as constituent elements. In terms of a mass ratio, an $Al_2O_3/SiO_2$ ratio in the oxide is preferably within a range of 50 to 99.5/50 to 0.5, more preferably within a range of 70 to 85/30 to 15.

Moreover, the alumina-silica fiber base material may be an oxide that contains only aluminum and silicon as the constituent elements; however, may be an oxide that contains aluminum, silicon and other elements as the constituent elements as long as the fiber strength of the inorganic fiber catalyst is maintained and performance of the catalyst component particles are not impaired. As the other elements, for example, magnesium, nickel, chromium, boron and the like can be mentioned. In such oxides, when the component of alumina is increased more than the ratio of $Al_2O_3:SiO_2=99.5:0.5$ (mass ratio), the mechanical strength of the inorganic fiber catalyst is sometimes decreased, and when the component of the alumina is decreased more than the ratio of $Al_2O_3:SiO_2=50:50$ (mass ratio), heat resistance of the inorganic fiber catalyst is sometimes decreased.

Figure 2:
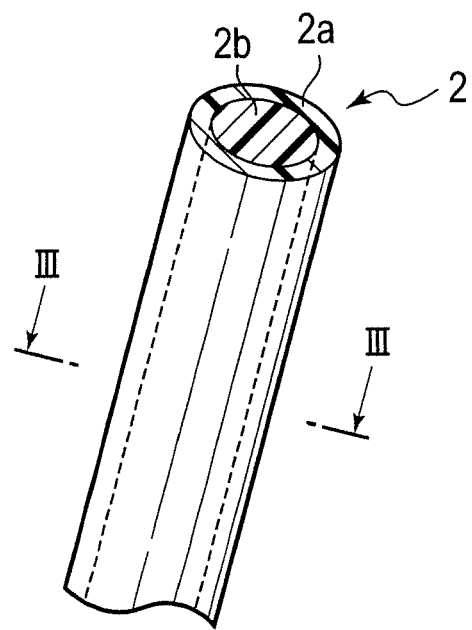
FIG. 2 is a perspective view showing another example of the inorganic fiber catalyst according to the embodiment of the present invention.

As described above, the inorganic fiber catalyst of the present invention includes: the alumina-silica fiber base material; and the catalyst component particles contained in the alumina-silica fiber base material. Moreover, the above-described inorganic fiber catalyst may have a structure formed of a uniform material as shown in FIG. 1, or may have a core-sheath structure when a cross section thereof is viewed as shown in FIG. 2. As will be described later, a fiber catalyst 1 as shown in FIG. 1 can be obtained from a spinning raw liquid that is single, and accordingly, production cost thereof can be reduced. Since an oxidation reaction of particulate matter (PM) occurs on the surface of the inorganic fiber catalyst, the above-described catalyst component particles just need to be present in at least a surface portion of the alumina-silica fiber base material. For example, as shown in FIG. 2, even with a structure in which the above-described catalyst component particles are not contained in a core portion 2b of a fiber catalyst 2 but contained only in a sheath portion 2a thereof, desired effects of the present invention can be obtained. Moreover, it is also possible to contain catalyst component particles different from each other in the sheath portion 2a and the core portion 2b of the fiber catalyst 2.

Figure 3:
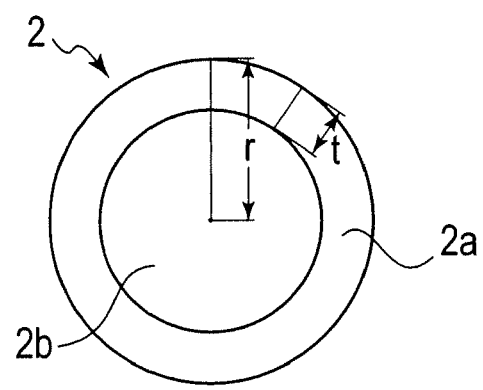
FIG. 3 is a cross-sectional view along a line III-III in FIG. 2.

Note that, as shown in FIG. 3, a thickness t of the sheath portion 2a is preferably ⅓ or more of a radius r of the cross section of the entire inorganic fiber catalyst 2. In such a way, the content of the above-described catalyst component particles in the inorganic fiber catalyst becomes 5% or more, whereby the particulate matter (PM) can be oxidized efficiently.

(Production Method of Inorganic Fiber Catalyst)

Next, a description will be made of a production method of the inorganic fiber catalyst according to the present invention. The production method of the inorganic fiber catalyst according to the present invention is characterized in using a raw material of the alumina-silica fiber base material, and oxide sol as a raw material of the catalyst component particles. Specifically, in the present invention, first, the raw material of the alumina-silica fiber base material and the oxide sol as the raw material of the catalyst component particles are mixed together, whereby a sol dispersion is obtained. Subsequently, the sol dispersion is spun into yarn, which is obtained as a precursor of the inorganic fiber catalyst. Thereafter, the precursor of the inorganic fiber catalyst is baked, whereby the desired inorganic fiber catalyst is obtained. In accordance with such a method using the oxide sol, there is obtained an inorganic fiber catalyst containing the microfabricated and highly dispersed catalyst component particles in a state of keeping the catalyst component particles less likely to exfoliate from alumina-silica fiber base material. Moreover, the inorganic fiber catalyst thus obtained also exerts an additional effect that the heat resistance thereof is excellent.

A description will be made of the oxide sol more in detail. As described above, the present invention is characterized in that the oxide sol is used, in which the oxide particles as the catalyst component particles are dispersed into a dispersion medium. As the method of producing the fiber catalyst, there is also a method of obtaining the precursor of the inorganic fiber catalyst from a solution containing the raw material of the alumina-silica fiber base material and metal salt serving as the raw material of the catalyst component particles, followed by baking. However, in the raw material of the catalyst component particles, which is derived from the metal salt, a particle diameter thereof is small, and the particle growth and segregation are prone to occur when the raw material of the catalyst component particles is baked. Meanwhile, in the oxide sol, the oxide as the catalyst component particles forms the particles in advance in such a dispersion medium. Moreover, such oxide particles have a sharp particle size distribution at around several ten nanometers. Furthermore, surface energy of the oxide particles is smaller than that of the metal salt of which particle diameter is small, and further, the oxide particles are surrounded by the alumina-silica fiber base material. Accordingly, the particles are less likely to move, and therefore, the particle growth and segregation are less likely to occur. Therefore, the fiber catalyst is prepared by using the oxide sol, whereby a fiber catalyst can be obtained, which is excellent not only in oxidation function for the particulate matter (PM) but also in heat resistance.

Next, a description will be made of an example of the production method of the inorganic fiber catalyst. In this production method, first, a water-soluble organic polymer is mixed as a spinning assistant with the raw material of the alumina-silica fiber base material and the oxide sol as the raw material of the catalyst component particles. Then, a mixture thus obtained is condensed until a viscosity thereof reaches a predetermined value, for example, 20 to 800 Pa·s, preferably 80 to 500 Pa·s, whereby the spinning raw liquid is prepared. Thereafter, the obtained spinning raw liquid is subjected to dry spinning, whereby the precursor of the inorganic fiber catalyst can be obtained. Subsequently, the precursor of the inorganic fiber catalyst is baked at 1100° C. or more, whereby the desired inorganic fiber catalyst is obtained. Here, the dry spinning refers to a method of spinning the raw material into the fiber in such a manner that the raw material mixed in a solvent is extruded from a nozzle in a hot atmosphere, followed by vaporization of the solvent. The dry spinning can be performed by using a publicly known dry spinning machine. Moreover, as a method of baking the precursor, for example, there is mentioned a method of heating the precursor to 450° C. at a temperature rise rate of 100° C./h, subsequently heating the precursor to 1150° C. at a temperature rise rate of 300° C./h, and further baking the precursor at 1150° C. for 1 hour.

Here, the inorganic fiber catalyst 1 formed of the uniform material can be obtained from the single spinning raw liquid by performing the dry spinning therefor. Moreover, the inorganic fiber catalyst 2 with the core-sheath structure can be obtained from two types of the spinning raw liquids by performing the dry spinning therefor by using a publicly known nozzle for core-sheath type composite fiber.

As the raw material of the above-described alumina-silica fiber base material, it is desirable to use an aluminum-containing liquid and a silicon-containing liquid. As the aluminum-containing liquid, for example, there can be mentioned a basic aqueous solution of aluminum chloride, a basic aqueous solution of aluminum acetate, a basic aqueous solution of aluminum nitrate, and the like. Meanwhile, as the silicon-containing liquid, silica sol, a siloxane compound and the like can be mentioned.

Moreover, as the oxide sol that is the raw material of the catalyst component particles, it is desirable to use oxide sol containing, as constituent elements, cerium, praseodymium, yttrium, lanthanum, zirconium, gallium, manganese, and arbitrary combinations of these elements.

Furthermore, as the above-described water-soluble organic polymer, for example, there can be mentioned an aqueous solution of polyvinyl alcohol (PVA), an aqueous solution of polyethylene oxide (PEO), and the like.

Here, a description will be made of the oxide sol for use as the raw material of the catalyst component particles. Besides commercially available articles, the oxide sol can be obtained by a method to be described below. First, an alkaline aqueous solution such as an ammonia aqueous solution is added to an aqueous solution of the metal salt, for example, nitrate, sulfate, acetate or the like of the above-described cerium, praseodymium, yttrium or the like, a mixture thus obtained is gelated, and a precipitate is obtained. Next, the obtained precipitate (sol) is washed with water, and subsequently, is aged by performing hydrothermal synthesis therefor in an autoclave, followed by drying, whereby sol powder is obtained. At this time, the sol powder becomes oxide sol with a small particle diameter, and the particle diameter is of a nanometer level. Accordingly, a diffraction pattern obtained by X-ray diffraction analysis (XRD) becomes broad. Next, the obtained sol powder is mixed with acetic acid, nitric acid, a solution of organic surfactant and the like, whereby an oxide sol dispersion can be obtained.

(Catalyst Structure)

Next, a description will be made of a catalyst structure of the present invention. The catalyst structure of the present invention includes the inorganic fiber catalyst of the present invention. As such a catalyst structure, for example, there can be mentioned a structure in which the inorganic fiber catalyst is aggregated (that is, an aggregated catalyst structure), a structure in which the inorganic fiber catalyst is supported on a support body (that is, a supported catalyst structure), and the like. For example, the above-described aggregated catalyst structure collects the PM with ease, and becomes easy to handle. Moreover, the above-described supported catalyst structure easily imparts desired shape and strength to the inorganic fiber catalyst, and also becomes easy to handle.

As the aggregated catalyst structure, for example, there can be mentioned those obtained by a sheet making method, such as fabric and knit. For example, the fabric can be processed into plain weave, sateen weave, and the like, and the knit can be processed into warp knit, weft knit and the like. Moreover, as the sheet making method, there can be employed a method using continuous sheet making equipment such as a cylinder sheet machine and a Fourdrinier machine, a batch sheet making method of pouring slurry into a sheet making box, a method of making a sheet from slurry by using a plain net, and the like. In the case of the sheet making method, it is preferable to blend 3 to 20 weight parts of an organic binder, for example, such as an acrylic emulsion, a vinyl chloride emulsion, polystyrene emulsion and NBR latex with 100 weight parts of the inorganic fiber catalyst. The organic binder can be blended by a method of blending a predetermined amount of the inorganic fiber catalyst and a predetermined amount of the organic binder with each other in advance, a method of making a cake by subjecting slurry of only the inorganic fiber catalyst to the sheet making, and then spraying a solution containing the organic binder onto the cake from the above thereof, followed by suction from the below thereof, a method of combining these methods, or the like. In this case, the catalyst component can be contained in the slurry.

FIG. 3 shows an example of the aggregated catalyst structure using the inorganic fiber catalyst of the present invention. An aggregated catalyst structure 10 is a structure in which the inorganic fiber catalyst 1 (or 2) of the present invention is subjected to plain weaving. Note that, though FIG. 3 only shows one aggregated catalyst structure 10, a plurality of the aggregated catalyst structures 10 may be stacked on one another and used.

As the supported catalyst structure, for example, there can be illustrated a structure in which the above-described inorganic catalyst is combined with a support body such as a stainless steel net, stainless steel foil, a ceramic plate (cordierite, SiC), a so-called wall-flow type diesel particulate filter (cordierite, SiC), a straight-flow type honeycomb support, a ceramic foam plate and a ceramic mat (cordierite, SiC).

Figure 4:
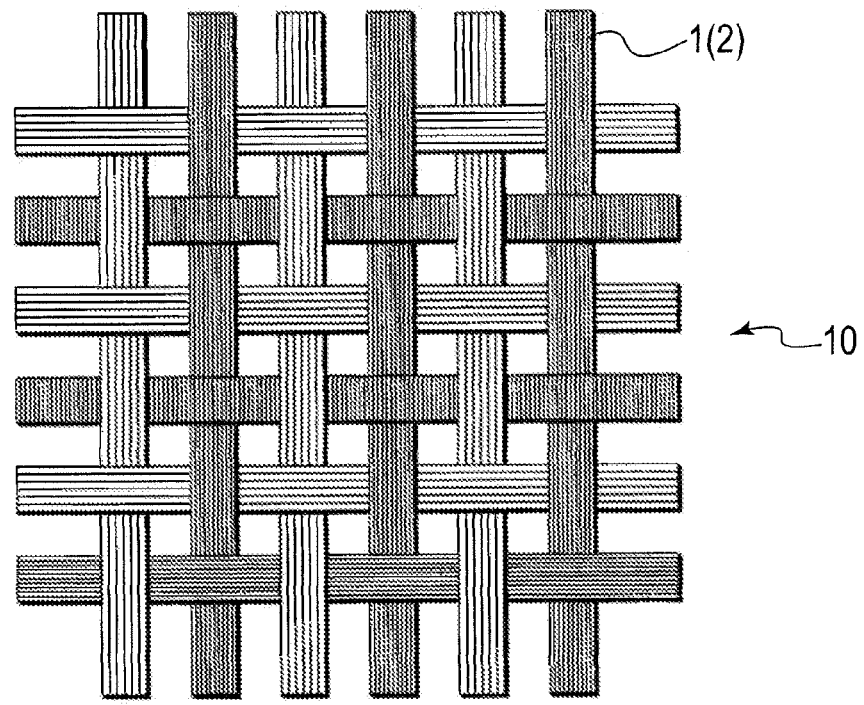
FIG. 4 is a schematic view showing an example of a catalyst structure according to the embodiment of the present invention.
Figure 5:
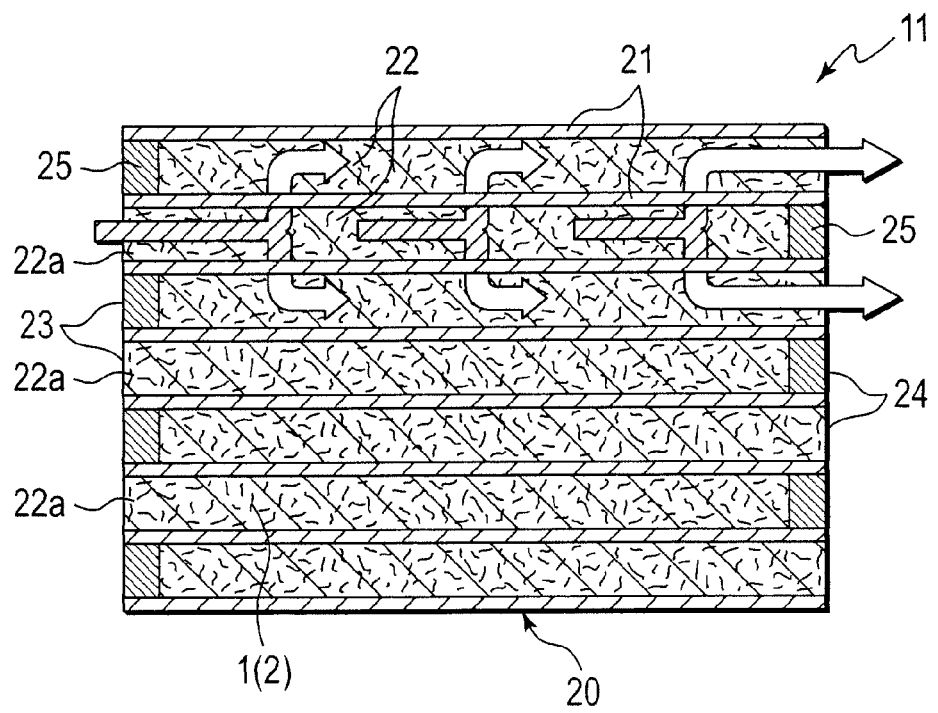
FIG. 5 is a cross-sectional view showing another example of the catalyst structure according to the embodiment of the present invention.

FIG. 4 shows an example of the supported catalyst structure using the inorganic fiber catalyst of the present invention. A supported catalyst structure 11 is a structure formed by combining a wall-flow type diesel particulate filter (DPF) 20 and the inorganic fiber catalyst 1 (or 2) of the present invention with each other. The DPF 20 includes, as filter elements, cell walls 21 having a plurality of pores of which diameter is sufficient for removing the PM. The DPF 20 has a cross-sectional structure made of polygons partitioned by the cell walls 21. In the DPF 20, a plurality of cells 22 are formed parallel to one another. Moreover, cell inlets 23 of the cells 22, which are adjacent to one another, and cell outlets 24 thereof, which are adjacent to one another, are closed by sealing portions 25 alternately in a zigzag manner. As shown by arrows in FIG. 5, exhaust gas flows into the DPF 20 from such cells open at the cell inlets 23 of the DPF 20, passes through the plurality of pores of the cell walls 21, flows into the adjacent cells 22, and is discharged from the cell outlets 24 at open ends of the cells 22.

In the supported catalyst structure 11, the inorganic fiber catalyst 1 is disposed in the cells 22. In such a way, the PM in the exhaust gas can be collected not only by the cell walls 21 of the DPF 20 but also by the inorganic fiber catalyst 1. Then, the PM collected by the inorganic fiber catalyst 1 is oxidizing by contacting the catalyst component, and is discharged from the DPF 20.

Each of these aggregated catalyst structure and supported catalyst structure can be formed, for example, into a diesel particulate filter that has desired shape and strength, and further, collects the PM with ease. For example, there can be mentioned diesel particulate filters molded to a bellows shape and a honeycomb shape. Moreover, each of the catalyst structures as described above can oxidize or burn the collected PM from a temperature lower than a temperature at which the PM is self-burnt, and thereby can purify the PM.

A description will be made of the present invention more in detail by examples and comparative examples; however, the present invention is not limited to these examples.

(Preparation of Raw Material)

As the raw material of the alumina-silica fiber base material, an aluminum oxychloride solution (an aqueous solution of aluminum chloride, made by Wako Pure Chemical Industries, Ltd.; purity of the used aluminum chloride is 99.9%) and silica sol (SNOWTEX, made by Nissan Chemical Industries, Ltd.) were prepared. Moreover, as the raw material of the catalyst component particles of the examples, there were prepared a $CeO_2$ nano-order sol dispersion, $CeO_2$—$Pr_6O_{11}$ nano-order sol dispersion, $CeO_2$—$Pr_6O_{11}$—$MnO_2$ nano-order sol powder, $CeO_2$—$Y_2O_3$ nano-order sol powder, and $CeO_2$—$Y_2O_3$—$MnO_2$ nano-order sol powder, which are the oxide sols. Note that these oxide sols serving as the raw materials of the catalyst component particles were prepared from cerium nitrate (made by Wako Pure Chemical Industries, Ltd.; purity: 99.9%), yttrium nitrate (made by Wako Pure Chemical Industries, Ltd.; purity: 99.9%), praseodymium nitrate (made by Wako Pure Chemical Industries, Ltd.; purity: 99.9%), and manganese nitrate (made by Wako Pure Chemical Industries, Ltd.; purity: 98%) in accordance with the above-described production method of the oxide sol. Moreover, as the raw material of the catalyst component particles of the comparative examples, cerium nitrate (made by Wako Pure Chemical Industries, Ltd.; purity: 99.9%) and praseodymium nitrate (made by Wako Pure Chemical Industries, Ltd.; purity: 99.9%), which are not the oxide sols, were prepared. Moreover, as the spinning assistant, an aqueous solution of polyvinyl alcohol (polyvinyl alcohol; made by Wako Pure Chemical Industries, Ltd.; saponification degree: 78 to 80 mol %) was prepared.

Example 1

First, the silica sol was added to the aluminum oxychloride solution so that a weight ratio of $Al_2O_3$ to $SiO_2$ could be 80:20, the aqueous solution of the polyvinyl alcohol was added thereto, and the $CeO_2$ nano-order sol dispersion was further added thereto so that a content of the oxide could be 12%. Then, a viscosity of the solution thus obtained was adjusted, whereby a sol dispersion was obtained. Subsequently, the sol dispersion was subjected to the dry spinning so that a fiber diameter of an inorganic fiber catalyst to be obtained could become 30 µm, whereby a precursor of the inorganic fiber catalyst was obtained. Thereafter, the precursor of the inorganic fiber catalyst was baked at 1150° C. for 1 hour, whereby an inorganic fiber catalyst of this example was obtained.

Example 2

Similar operations to those of Example 1 were performed except that the dry spinning was performed so that a fiber diameter of an inorganic fiber catalyst to be obtained could become 15 µm, whereby an inorganic fiber catalyst of this example was obtained.

Example 3

Similar operations to those of Example 1 were performed except that the dry spinning was performed so that a fiber diameter of an inorganic fiber catalyst to be obtained could become 7 µm, whereby an inorganic fiber catalyst of this example was obtained.

Example 4

Similar operations to those of Example 1 were performed except that the dry spinning was performed so that a fiber diameter of an inorganic fiber catalyst to be obtained could become 5 µm, whereby an inorganic fiber catalyst of this example was obtained.

Example 5

Similar operations to those of Example 1 were performed except that, in place of the $CeO_2$ nano-order sol dispersion, the $CeO_2$—$Pr_6O_{11}$ nano-order sol dispersion was used as the raw material of the catalyst component particles, whereby an inorganic fiber catalyst of this example was obtained.

Example 6

Similar operations to those of Example 1 were performed except that, in place of the $CeO_2$ nano-order sol dispersion, the $CeO_2$—$Pr_6O_{11}$ nano-order sol dispersion was used as the raw material of the catalyst component particles, and that the dry spinning was performed so that a fiber diameter of an inorganic fiber catalyst to be obtained could become 15 µm, whereby an inorganic fiber catalyst of this example was obtained.

Example 7

Similar operations to those of Example 1 were performed except that, in place of the $CeO_2$ nano-order sol dispersion, the $CeO_2$—$Pr_6O_{11}$ nano-order sol dispersion was used as the raw material of the catalyst component particles, and that the dry spinning was performed so that a fiber diameter of an inorganic fiber catalyst to be obtained could become 7 µm, whereby an inorganic fiber catalyst of this example was obtained.

Example 8

Similar operations to those of Example 1 were performed except that, in place of the $CeO_2$ nano-order sol dispersion, the $CeO_2$—$Pr_6O_{11}$ nano-order sol dispersion was used as the raw material of the catalyst component particles, and that the dry spinning was performed so that a fiber diameter of an inorganic fiber catalyst to be obtained could become 5 µm, whereby an inorganic fiber catalyst of this example was obtained.

Example 9

Similar operations to those of Example 1 were performed except that, in place of the $CeO_2$ nano-order sol dispersion, the $CeO_2$—$Pr_6O_{11}$—$MnO_2$ nano-order sol powder was used as the raw material of the catalyst component particles, whereby an inorganic fiber catalyst of this example was obtained.

Example 10

Similar operations to those of Example 1 were performed except that, in place of the $CeO_2$ nano-order sol dispersion, the $CeO_2$—$Pr_6O_{11}$—$MnO_2$ nano-order sol powder was used as the raw material of the catalyst component particles, and that the dry spinning was performed so that a fiber diameter of an inorganic fiber catalyst to be obtained could become 15 µm, whereby an inorganic fiber catalyst of this example was obtained.

Example 11

Similar operations to those of Example 1 were performed except that, in place of the $CeO_2$ nano-order sol dispersion, the $CeO_2$—$Pr_6O_{11}$—$MnO_2$ nano-order sol powder was used as the raw material of the catalyst component particles, and that the dry spinning was performed so that a fiber diameter of an inorganic fiber catalyst to be obtained could become 7 µm, whereby an inorganic fiber catalyst of this example was obtained.

Example 12

Similar operations to those of Example 1 were performed except that, in place of the $CeO_2$ nano-order sol dispersion, the $CeO_2$—$Pr_6O_{11}$—$MnO_2$ nano-order sol powder was used as the raw material of the catalyst component particles, and that the dry spinning was performed so that a fiber diameter of an inorganic fiber catalyst to be obtained could become 5 μm, whereby an inorganic fiber catalyst of this example was obtained.

Example 13

Similar operations to those of Example 1 were performed except that, in place of the $CeO_2$ nano-order sol dispersion, the $CeO_2$—$Y_2O_3$ nano-order sol powder was used as the raw material of the catalyst component particles, whereby an inorganic fiber catalyst of this example was obtained.

Example 14

Similar operations to those of Example 1 were performed except that, in place of the $CeO_2$ nano-order sol dispersion, the $CeO_2$—$Y_2O_3$ nano-order sol powder was used as the raw material of the catalyst component particles, and that the dry spinning was performed so that a fiber diameter of an inorganic fiber catalyst to be obtained could become 15 μm, whereby an inorganic fiber catalyst of this example was obtained.

Example 15

Similar operations to those of Example 1 were performed except that, in place of the $CeO_2$ nano-order sol dispersion, the $CeO_2$—$Y_2O_3$ nano-order sol powder was used as the raw material of the catalyst component particles, and that the dry spinning was performed so that a fiber diameter of an inorganic fiber catalyst to be obtained could become 7 μm, whereby an inorganic fiber catalyst of this example was obtained.

Example 16

Similar operations to those of Example 1 were performed except that, in place of the $CeO_2$ nano-order sol dispersion, the $CeO_2$—$Y_2O_3$ nano-order sol powder was used as the raw material of the catalyst component particles, and that the dry spinning was performed so that a fiber diameter of an inorganic fiber catalyst to be obtained could become 5 μm, whereby an inorganic fiber catalyst of this example was obtained.

Example 17

Similar operations to those of Example 1 were performed except that, in place of the $CeO_2$ nano-order sol dispersion, the $CeO_2$—$Y_2O_3$—$MnO_2$ nano-order sol powder was used as the raw material of the catalyst component particles, whereby an inorganic fiber catalyst of this example was obtained.

Example 18

Similar operations to those of Example 1 were performed except that, in place of the $CeO_2$ nano-order sol dispersion, the $CeO_2$—$Y_2O_3$—$MnO_2$ nano-order sol powder was used as the raw material of the catalyst component particles, and that the dry spinning was performed so that a fiber diameter of an inorganic fiber catalyst to be obtained could become 15 μm, whereby an inorganic fiber catalyst of this example was obtained.

Example 19

Similar operations to those of Example 1 were performed except that, in place of the $CeO_2$ nano-order sol dispersion, the $CeO_2$—$Y_2O_3$—$MnO_2$ nano-order sol powder was used as the raw material of the catalyst component particles, and that the dry spinning was performed so that a fiber diameter of an inorganic fiber catalyst to be obtained could become 7 μm, whereby an inorganic fiber catalyst of this example was obtained.

Example 20

Similar operations to those of Example 1 were performed except that, in place of the $CeO_2$ nano-order sol dispersion, the $CeO_2$—$Y_2O_3$—$MnO_2$ nano-order sol powder was used as the raw material of the catalyst component particles, and that the dry spinning was performed so that a fiber diameter of an inorganic fiber catalyst to be obtained could become 5 μm, whereby an inorganic fiber catalyst of this example was obtained.

Comparative Example 1

Similar operations to those of Example 1 were performed except that, in place of the $CeO_2$ nano-order sol dispersion, the cerium nitrate was used as the raw material of the catalyst component particles, whereby an inorganic fiber catalyst of this example was obtained.

Comparative Example 2

Similar operations to those of Example 1 were performed except that, in place of the $CeO_2$ nano-order sol dispersion, the cerium nitrate was used as the raw material of the catalyst component particles, and that the dry spinning was performed so that a fiber diameter of an inorganic fiber catalyst to be obtained could become 15 μm, whereby an inorganic fiber catalyst of this example was obtained.

Comparative Example 3

Similar operations to those of Example 1 were performed except that, in place of the $CeO_2$ nano-order sol dispersion, the cerium nitrate was used as the raw material of the catalyst component particles, and that the dry spinning was performed so that a fiber diameter of an inorganic fiber catalyst to be obtained could become 7 μm, whereby an inorganic fiber catalyst of this example was obtained.

Comparative Example 4

Similar operations to those of Example 1 were performed except that, in place of the $CeO_2$ nano-order sol dispersion, the cerium nitrate was used as the raw material of the catalyst component particles, and that the dry spinning was performed so that a fiber diameter of an inorganic fiber catalyst to be obtained could become 5 μm, whereby an inorganic fiber catalyst of this example was obtained.

Comparative Example 5

Similar operations to those of Example 1 were performed except that, in place of the $CeO_2$ nano-order sol dispersion, the cerium nitrate and the praseodymium nitrate were used as the raw material of the catalyst component particles, whereby an inorganic fiber catalyst of this example was obtained.

Comparative Example 6

Similar operations to those of Example 1 were performed except that, in place of the $CeO_2$ nano-order sol dispersion, the cerium nitrate and the praseodymium nitrate were used as the raw material of the catalyst component particles, and that the dry spinning was performed so that a fiber diameter of an inorganic fiber catalyst to be obtained could become 15 μm, whereby an inorganic fiber catalyst of this example was obtained.

Comparative Example 7

Similar operations to those of Example 1 were performed except that, in place of the $CeO_2$ nano-order sol dispersion, the cerium nitrate and the praseodymium nitrate were used as the raw material of the catalyst component particles, and that the dry spinning was performed so that a fiber diameter of an inorganic fiber catalyst to be obtained could become 7 μm, whereby an inorganic fiber catalyst of this example was obtained.

Comparative Example 8

Similar operations to those of Example 1 were performed except that, in place of the $CeO_2$ nano-order sol dispersion, the cerium nitrate and the praseodymium nitrate were used as the raw material of the catalyst component particles, and that the dry spinning was performed so that a fiber diameter of an inorganic fiber catalyst to be obtained could become 5 μm, whereby an inorganic fiber catalyst of this example was obtained.

Figure 6B:
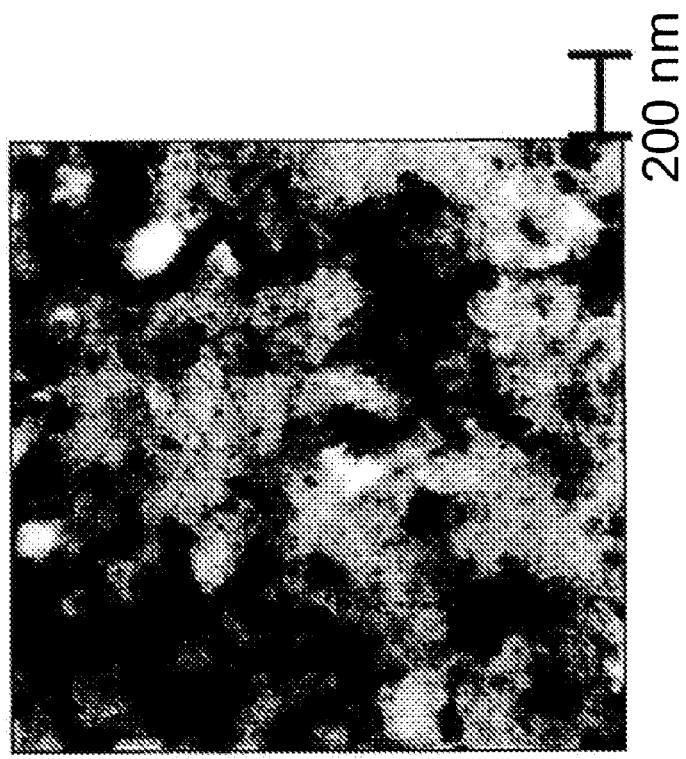
FIG. 6B is a transmission electron microscope photograph of a cross section of an inorganic fiber catalyst of Comparative example 1.
Figure 6A:
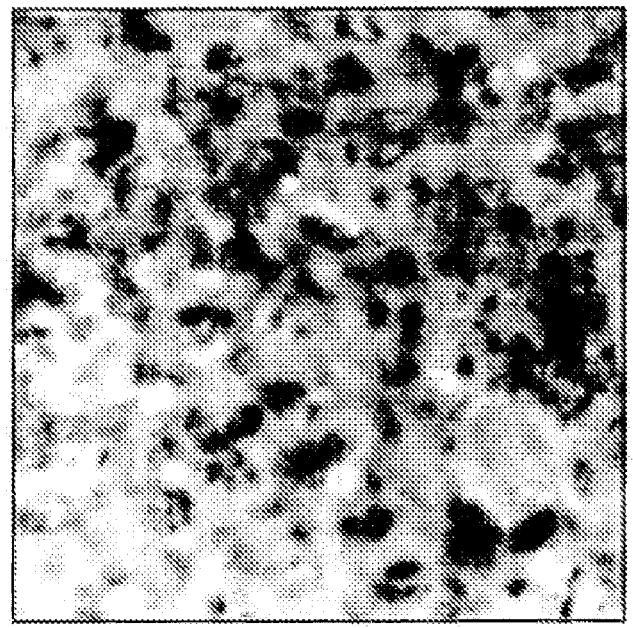
FIG. 6A is a transmission electron microscope photograph of a cross section of an inorganic fiber catalyst of Example 1.
Figure 7B:
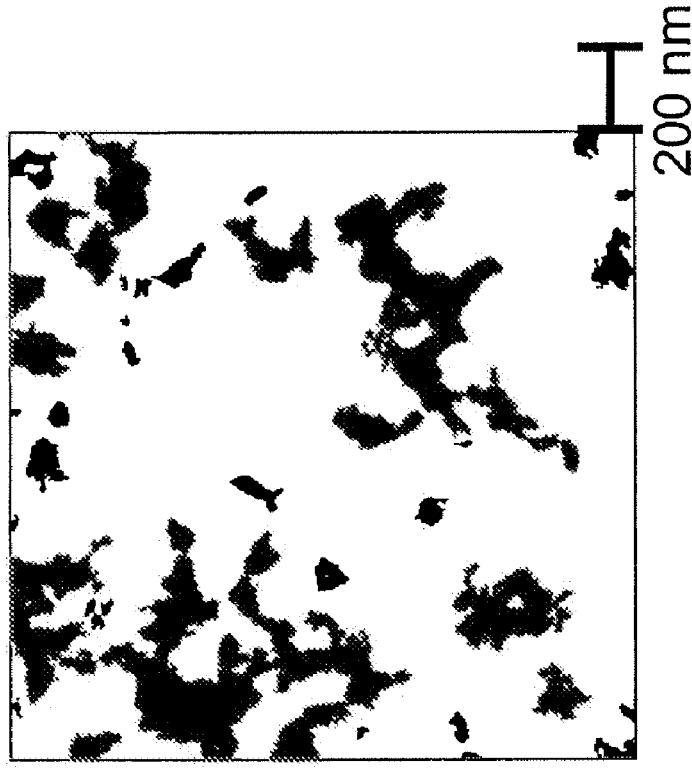
FIG. 7B is image data obtained by performing the image analysis processing for the transmission electron microscope photograph of FIG. 6B.
Figure 7A:
FIG. 7A is image data obtained by performing image analysis processing for the transmission electron microscope photograph of FIG. 6A.

Specifications of the above-described respective examples are shown in FIG. 8. Here, mean particle diameters in FIG. 8 were measured and calculated by the following method. First, the inorganic fiber catalyst of each of the examples was embedded in resin, the extremely thin slice was cut out therefrom by the FIB process, and the cross section of the fiber was observed by the TEM. Subsequently, by the commercially available software (A-zo kun (trade name), made by Asahi Kasei Engineering Corporation), the catalyst component particles were subjected to the image analysis processing from the field of view with a square of 1.5 μm length and 1.5 μm width in the observed image, whereby the projected area of 30 or more of the catalyst component particles was measured. Moreover, the projected area equivalent diameters (Heywood diameters) of the respective catalyst component particles were calculated, and the arithmetic mean of the projected area equivalent diameters was calculated, whereby the mean particle diameter was obtained. Furthermore, the standard deviation was also calculated from the projected area equivalent diameters of the respective catalyst component particles. Note that FIGS. 6A and 6B are TEM photographs of the cross sections of the fibers in Example 1 and Comparative example 1. Moreover, FIGS. 7A and 7B are image data obtained by performing the image analysis processing for the TEM photographs of FIGS. 6A and 6B. Specifically, FIGS. 7A and 7B show the catalyst component particles of FIGS. 6A and 6B by black portions.

Moreover, as a result of observing the inorganic fiber catalysts of the respective examples by the TEM and measuring the catalyst particle diameters, it was confirmed that the catalyst particle diameters were 1 nm to 100 nm in Examples 1 to 8 and 13 to 16, were 1 nm to 200 nm in Examples 9 to 12 and 17 to 20, and were 1 nm to 2000 nm in Comparative examples 1 to 8.

Moreover, $d_a/d_b$ in FIG. 8 is the ratio ($d_a/d_b$) of the first crystallite diameter $d_a$ to the second crystallite diameter $d_b$, in which the second crystallite diameter $d_b$ is the diameter at the initial period (that is, before the catalyst component particles are subjected to the heat treatment) of the catalyst component particles in the inorganic fiber catalyst of each of the examples, and the first crystallite diameter $d_a$ is the diameter after the catalyst component particles are subjected to the heat treatment at 1100° C. for 3 hours in the air. Note that each of the crystallite diameters was obtained by the calculation in the Scherrer's equation using a full width at half maximum (FWHM) of a diffraction peak in the inorganic fiber catalyst of each example, which was obtained by performing XRD measurement therefor under the following measurement conditions.

(XRD Measurement Conditions)
Apparatus name: X-ray diffraction apparatus (MXP18VAHF), made by Bruker AXS K. K.
Current/voltage: 40 kV/300 mA
X-ray wavelength: CuKa

[Performance Evaluation]

Performance of the inorganic fiber catalyst of each of the above-described examples and comparative examples was evaluated by the following method.

(Fabrication of Catalyst Structure)

The inorganic fiber catalyst of each of the above-described examples was cut into pieces with a length of approximately 15 mm, and nonwoven fabric was fabricated by a paper making machine. A thickness of the nonwoven fabric was approximately 5 mm. 10 sheets of the nonwoven fabric were stacked on one another, whereby a catalyst structure was fabricated.

(Soot Deposition)

The catalyst structure obtained by using the inorganic fiber catalyst of each of the above-described examples was mounted on an exhaust system of a straight four-cylinder engine with a displacement of 2500 cc, which is made by Nissan Motor Co., Ltd. Then, soot was deposited on the catalyst structure.

(Catalyst Performance Evaluation)

For the catalyst structure obtained by using the inorganic fiber catalyst of each of the examples, on which the soot was deposited as described above, catalyst performance evaluation was performed by using a fixed-bed flow reactor (made by Horiba, Ltd.). Reaction gas was made to contain oxygen with a concentration of 5 vol %, and nitrogen as balance gas. Then, an amount of carbon monoxide (CO) and carbon dioxide ($CO_2$) was measured, which were generated by oxidation of the soot deposited on the catalyst structure for 5 minutes under conditions where a catalyst-inlet gas temperature was 500° C. and a space velocity was 50,000/h. Obtained results are also written on FIG. 8.

From FIG. 8, the following is understood. In each of Examples 1 to 20 which belong to the scope of the present invention, the mean particle diameter was set at 50 nm or less, and the standard deviation thereof was set at 30 or less, and accordingly, the generated amount of CO and $CO_2$ is larger than that in each of Comparative examples 1 to 8 (mean particle diameter: 50 to 100 nm; standard deviation: 40 to 60) out of the present invention, and the catalytic activity is superior to that in each of Comparative examples 1 to 8.

Moreover, the following is understood from FIG. 8. In each of Examples 1 to 20 which belong to the scope of the present invention, the ratio $d_a/d_b$ is 1.2 to 1.5, and the particle growth of the catalyst component particles is suppressed in comparison with each of Comparative examples 1 to 8 ($d_a/d_b$: 11 to 13) out of the present invention, accordingly, the heat resistance is excellent.

Furthermore, the following is understood from FIGS. 6A and 6B and FIGS. 7A and 7B. In each of Examples 1 to 20 which belong to the scope of the present invention and Comparative examples 1 to 8 out of the present invention, the catalyst component particles are embedded in the alumina-silica fiber base material, and accordingly, the catalyst component particles are contained in the alumina-silica fiber base material in the state of being less likely to exfoliate therefrom.

The entire content of a Japanese Patent Application No. P2007-207363 with a filing date of Aug. 9, 2007 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. An inorganic fiber catalyst, comprising:
   an alumina-silica fiber base material; and
   a plurality of catalyst component particles contained in said alumina-silica fiber base material, each of the catalyst component particles comprising an oxide containing at least one selected from the group consisting of cerium, praseodymium, yttrium, lanthanum, zirconium, gallium and manganese,
   wherein a mean particle diameter of the catalyst component particles contained in at least a surface portion of the alumina-silica fiber base material is 50 nm or less, and a standard deviation of particle diameters of the catalyst component particles is 30 or less, and
   wherein a content of the catalyst component particles in the inorganic fiber catalyst is within a range from 5 to 50 mass %.

2. The inorganic fiber catalyst according to claim 1, wherein the particle diameters of the catalyst component particles are within a range from 1 nm to 200 nm.

3. The inorganic fiber catalyst according to claim 1, wherein a ratio ($d_a/d_b$) of a first crystallite diameter $d_a$ to a second crystallite diameter $d_b$ is 1.0 to 1.5, in which the second crystallite diameter $d_b$ is a diameter before the catalyst component particles are subjected to heat treatment, and the first crystallite diameter $d_a$ is a diameter after the catalyst component particles are subjected to the heat treatment at 1100° C. for 3 hours in an air, the diameter being measured by X-ray diffraction.

4. The inorganic fiber catalyst according to claim 1, wherein the alumina-silica fiber base material comprises an oxide containing aluminum and silicon, and an $Al_2O_3/SiO_2$ ratio in the oxide is 50 to 99.5/50 to 0.5 in terms of a mass ratio.

5. The inorganic fiber catalyst according to claim 1, wherein the catalyst component particles are surrounded by the alumina-silica fiber base material.

6. A catalyst structure, comprising:
   the inorganic fiber catalyst according to claim 1.

* * * * *